Figure 3:
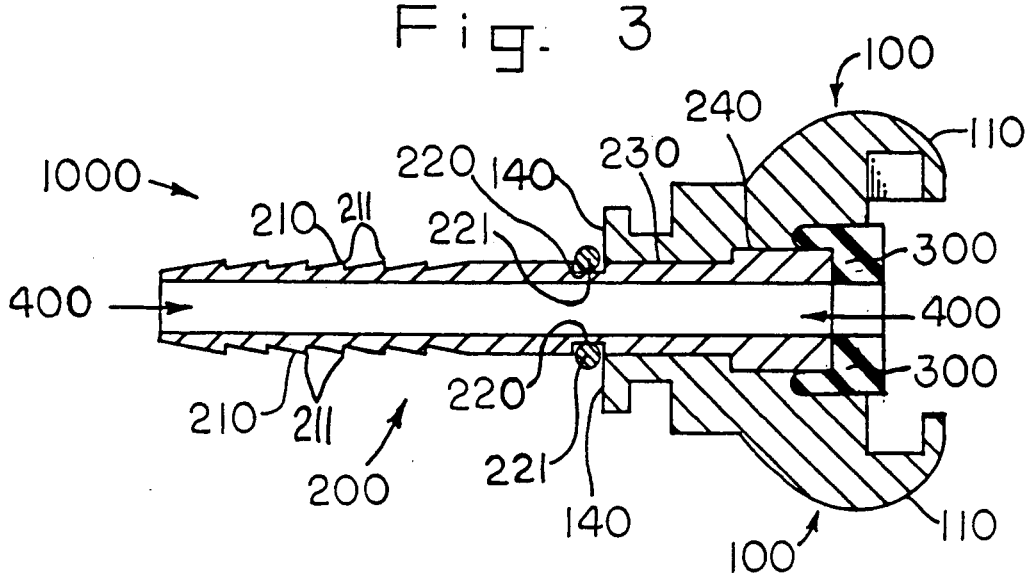

United States Patent [19]

Harle

[11] Patent Number: 5,005,875
[45] Date of Patent: Apr. 9, 1991

[54] ANTI-TORQUE COUPLING

[76] Inventor: William Harle, 7324 Cedar Valley Road, West Salem, Ohio 44287

[21] Appl. No.: 219,278

[22] Filed: Jul. 15, 1988

[51] Int. Cl.$^5$ ............................................. F16L 27/00
[52] U.S. Cl. ...................................... 285/73; 285/352; 285/360; 285/910; 285/239; 285/281
[58] Field of Search ...................... 285/91, 73, 77, 376, 285/360, 401, 361, 402, 78, 415, 239, 90, 281, 352, 910

[56] References Cited

U.S. PATENT DOCUMENTS

| 793,209 | 6/1905 | Miller | 285/415 |
|---|---|---|---|
| 894,900 | 8/1908 | Pohlman | 285/415 |
| 1,029,715 | 6/1912 | Robinson | 285/360 |
| 1,128,474 | 2/1915 | Martz | 285/91 |
| 1,914,368 | 6/1933 | Goodall | 285/73 |
| 2,132,506 | 10/1938 | Allen | 285/73 |
| 2,250,199 | 7/1941 | Kelly | 285/99 |
| 3,702,708 | 11/1972 | Moore | 285/91 X |
| 3,831,984 | 8/1974 | Kutina et al. | 285/73 |
| 4,502,701 | 3/1985 | Treloar et al. | 277/92 |

FOREIGN PATENT DOCUMENTS

| 22753 | 2/1893 | United Kingdom | 285/73 |
|---|---|---|---|
| 122583 | 1/1919 | United Kingdom | . |
| 137787 | 1/1920 | United Kingdom | 285/99 |
| 0284451 | 2/1928 | United Kingdom | 285/401 |
| 0288718 | 4/1928 | United Kingdom | 285/401 |
| 0883008 | 11/1961 | United Kingdom | 285/73 |

OTHER PUBLICATIONS

Dixon Valve & Coupling Co., Product Bulleton of Feb. 2, 1987 with Universal Coupling Torque Test.
J. E. Adams Industries, Inc., "High Pressure Swivels" and Low Pressure Swivels.
Ludecke, Inc., "'Lock On' New Super-Safety Couplings."

Primary Examiner—Dave W. Arola
Attorney, Agent, or Firm—Christopher John Rudy

[57] ABSTRACT

A universal-type coupling member including a head portion, a stem portion rotatable in the head portion, and a gasket inset in the head portion and in sealable contact with the stem portion, and having a fluid passageway therethrough is provided, which can be connected to another appropriate universal-type coupling member. Use of the coupling member of this invention can relieve the uncoupling effects of twist or torque in universal-type coupling combinations.

12 Claims, 3 Drawing Sheets

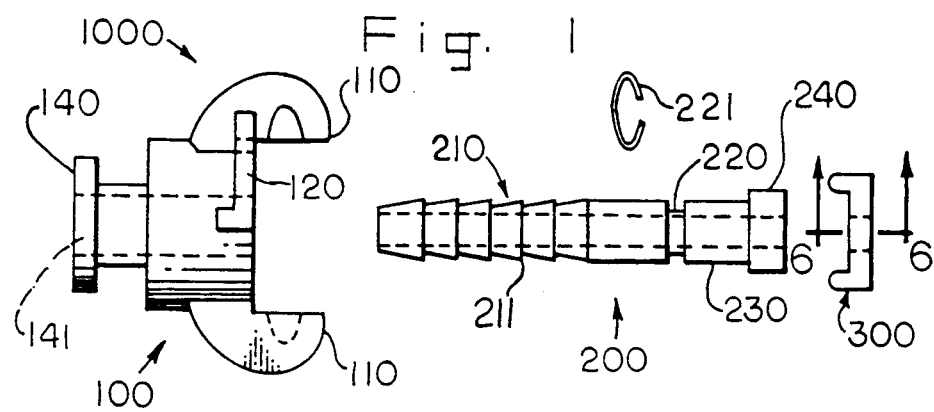
Fig. 1
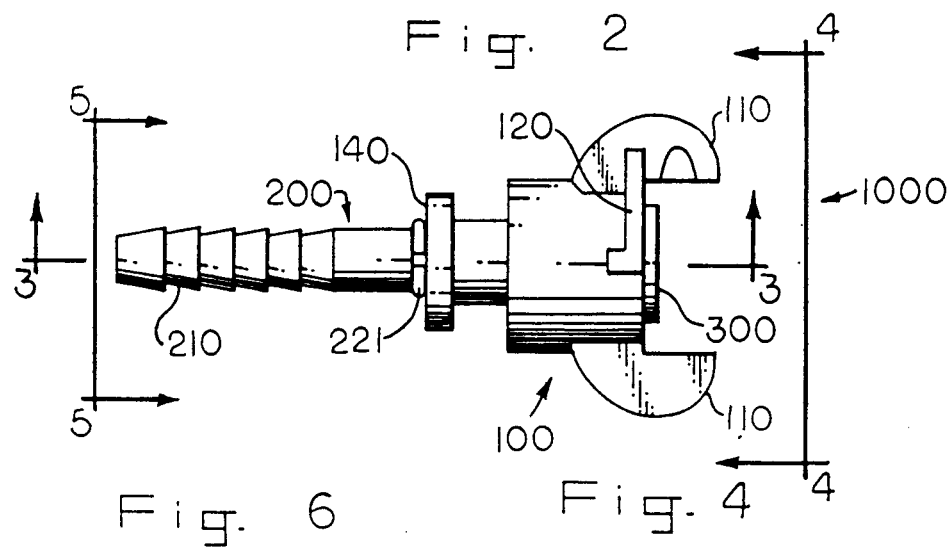
Fig. 2
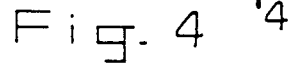
Fig. 6  Fig. 4
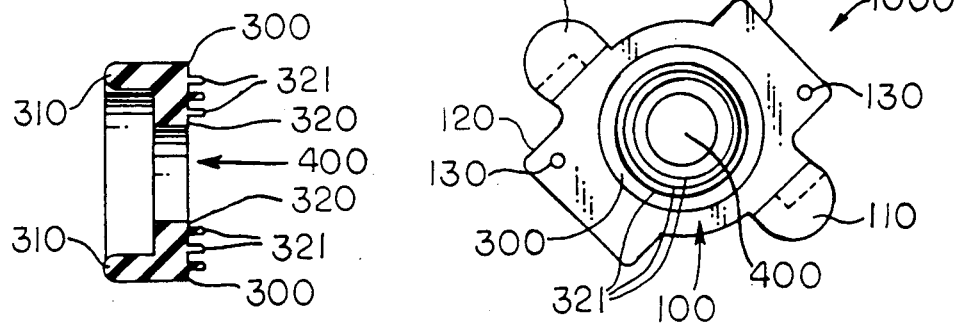

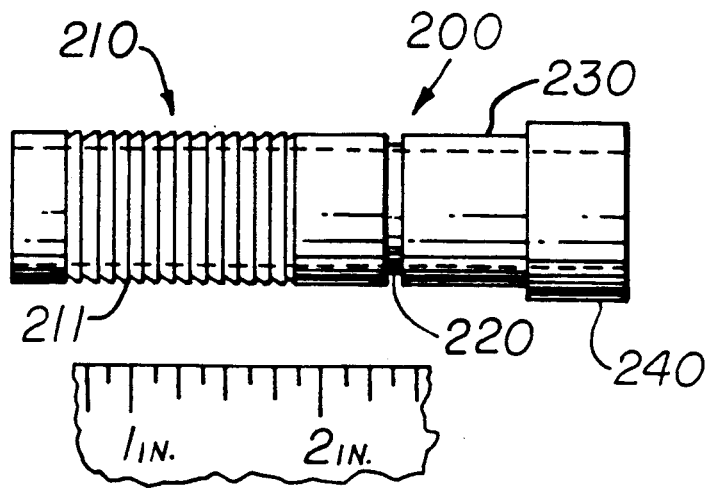
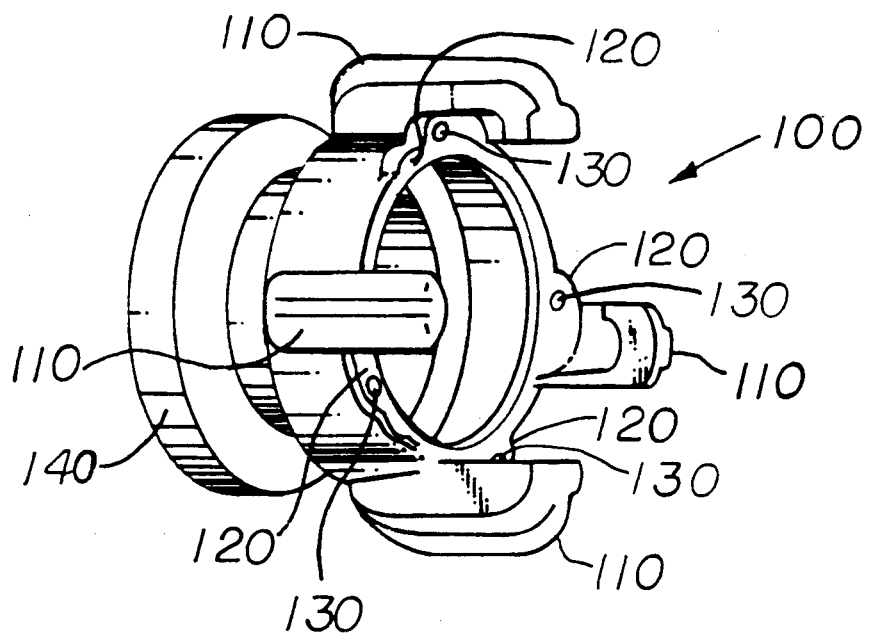

ANTI-TORQUE COUPLING

FIELD

This invention concerns couplings for fluid conduits.

BACKGROUND

The universal coupling was designed to be an inexpensive, quick-connecting, sexless coupling. This coupling was used primarily for the transfer of compressed gases such as air, and it has also been used for the transfer of such gaseous substances as steam and of such liquids as water.

The heads of universal couplings interlock with each other, and in general, all sizes of universal couplings from one-quarter of an inch to one inch fit with each other, and all sizes of universal couplings from one and one quarter of an inch to two inches fit with each other. Hence, the name "universal coupling" has been rendered and is known in the art.

The universal coupling may be a dangerous coupling even when it is used as intended and even more so when it is used with steam. Characteristics which can make the universal coupling dangerous in use in general include the twist which is present in formerly coiled and uncoiled-for-use hose conduit segments, which are coupled by the universal coupling, and the torque provided by the passage of fluid through the conduit segments which are coupled by the universal coupling, e.g., compressed air being passed between flexible hose conduit segments, especially when surging therethrough.

From its inception there have been many attempts to make the universal coupling a safer coupling by means of such features as retaining devices as well as by different gaskets. See, Goodall, U.S. Pat. No. 1,914,368 (Jun. 20, 1933). See also, e.g., Allen, U.S. Pat. No. 2,132,506 (Oct. 11, 1938); Kelly, U.S. Pat. No. 2,250,199 (Jul. 22, 1941); Kutina et al., U.S. Pat. No. 3,831,984 (Aug. 27, 1974); Treloar et al., U.S. Pat. No. 4,502,701 (Mar. 5, 1985).

The reason that attempts are made to make the universal coupling a safer coupling by improving its gasket is because the gasket in general provides the holding power of the universal coupling. The universal coupling requires the friction and pressure of the gasket assembly in order to hold its two heads together as is known in the art. See e.g., Dixon Valve and Coupling Co., Chesterton, Md. 21620, Product Bulletin of Feb. 2, 1987 with Universal Coupling Torque Test of a test conducted between May 22, 1986 and Aug. 8, 1986.

Furthermore, because it generally is the combination of friction and pressure of the gasket that keeps the two heads of a universal coupling together, gaskets for universal couplings are typically made to be very hard and stiff. Thus, for the most part, it may well be difficult for one to connect the two heads of such universal couplings.

SUMMARY

The present invention, in one aspect, provides an article of manufacture comprising a coupling member of the universal kind having a head portion, a stem portion rotatable in said head portion, and a gasket inset in said head portion and in sealable contact with said stem portion, said coupling member further having a fluid passageway through said head and stem portions and said gasket, and being adapted for connection by means for coupling said head portion to another coupling member of the universal kind having a coupleable head or head portion and a fluid passageway therethrough, said fluid passageways to be in sealable registry thereby. Another aspect provides a method for relieving uncoupling effects of twist or torque in a coupling combination of the universal coupling kind comprising employing at least one such coupling member of this invention in said coupling combination such that said stem portion rotates in said head portion whilst a surge of fluid is passed through its fluid passageway.

Significantly, the coupling member of this invention is a coupling member of the universal kind having a rotatable stem portion in its head portion. This novel feature provides for the relief of the uncoupling effects of torque because the stem portion rotates with twisting of coupled conduit, e.g., high pressure hose, and generally no amount of torque can uncouple the coupled combination with this coupling member therein. The coupling member, being of the universal kind, can thus be interchanged with other properly made universal-type couplings available but with greater safety, or two inventive coupling members can be thus employed with greater safety. Furthermore, the gasket of the coupling members of this invention can accordingly be of such a resilient substance and design that it makes it easier for the coupling combination employing such inventive coupling members to be coupled. A further advantage of employing the coupling member of the invention is that conduits, e.g., high pressure hoses, coupled therewith can last longer due to less abrasion and torsion from twisting. Moreover, the coupling members of this invention can last longer than their corresponding known counterparts because relief of such twisting and torsion by the rotating stem portion alleviates bending of the stem portion, which in known universal couplings causes stress, fatigue and even failure. Furthermore, the coupling member of this invention can throughput larger volumes of fluids, e.g., 25 percent by volume more, due to the design of the stem feature, and it is in general less expensive to manufacture due to its separable head and stem portion features, than are corresponding known couplings of the universal kind. Yet further unexpectedly superior and advantageous features attend this invention, which is further illustrated as follows:

DRAWINGS

The drawings form a part of the specification hereof.

FIG. 1 in general is an exploded, slightly see-through side elevational view of an embodiment of a coupling member 1000 of this invention. Briefly, the coupling member shown in FIG. 1 is one of the universal kind and thus shows head portion 100, stem portion 200, and gasket 300.

FIG. 2 in general is a side elevational view of an assembled embodiment of the coupling member 1000 of this invention. Briefly, the coupling member shown in FIG. 2 is one of the universal kind and shows head portion 100, stem portion 200, and gasket 300.

FIG. 3 in general is a longitudinal sectional view of the assembled coupling member 1000 of this invention taken generally on the line 3—3 of FIG. 2. Briefly, the coupling member shown in FIG. 3 shows head portion 100, stem portion 200, gasket 300, and fluid passageway 400.

FIG. 4 in general is a front cross-sectional view of the assembled coupling member 1000 of this invention taken generally on the line 4—4 of FIG. 2. Briefly, the coupling member shown in FIG. 4 shows head portion 100, gasket 300, and fluid passageway 400.

Figure 5:
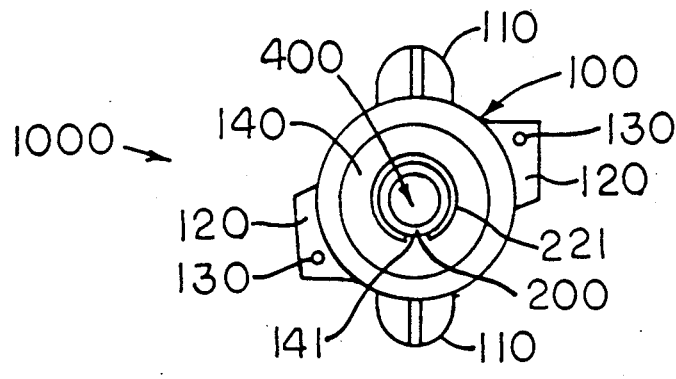

FIG. 5 in general is a rear cross-sectional view of the assembled coupling member 1000 of this invention taken generally on the line 5—5 of FIG. 2. Briefly, the coupling member shown in FIG. 5 shows head portion 100, stem portion 200, and fluid passageway 400.

FIG. 6 in general is a longitudinal sectional view of the gasket 300 of the coupling member 1000 of this invention taken generally on the line 6—6 of FIG. 1. Briefly, the gasket shown in FIG. 6 shows gasket 300 with fluid passageway 400.

Figure 7:
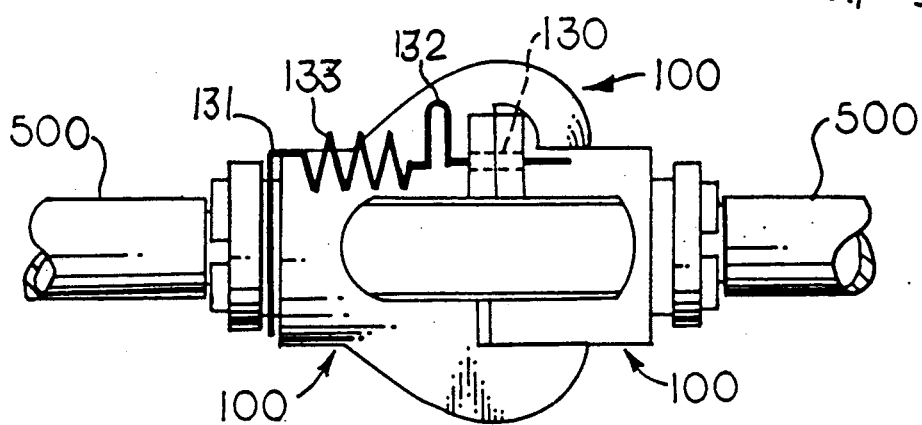

FIG. 7 in general is a side view of a couple combination of the universal kind employing at least one coupling member 1000 of this invention. Briefly, the coupled combination shown in FIG. 7 shows coupled head portions 100, and hose 500.

Figure 8:
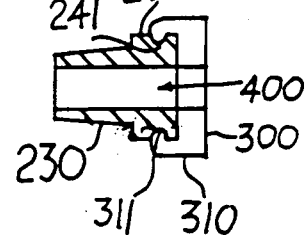

FIG. 8 in general is a longitudinal sectional view of other embodiments of stem portion 200 and gasket 300 of the coupling member 1000 of this invention taken generally along an extension of the line 3—3 of FIG. 2. Briefly, the embodiments shown in FIG. 8 show stem portion 200 and gasket 300 assembled in the coupling member 1000 of this invention, having fluid passageway 400 as well.

FIG. 9 in general is a side view in approximate scale of an embodiment of a stem portion of this invention. Briefly, the embodiment shown in FIG. 9 shows stem portion 200 having barbs 211 smaller and spaced closer together than are typically provided by casting.

FIG. 10 in general is a prespective front view of an embodiment of a head portion of this invention. Briefly, the embodiment shown in FIG. 10 shows head portion 100 of the universal kind having involving four cooperating jaws 110.

DETAIL

Each U.S. patent mentioned in this specification is incorporated herein by reference. The purposes for these incorporations are apparent to those skilled in the art.

In general, the coupling member of this invention includes head and stem portions and a gasket, each having fluid passageways therethrough for throughput of fluid, e.g., air, steam, water, etc., particularly a compressed gas, especially compressed air, in the assembled coupling member. The stem portion is rotatable in the head portion.

The coupling member of this invention is generally of the universal kind, i.e., is designed so that it can be connected with other known universal couplings by head-to-head interlocking with cooperating jaws as is known in the art. Thus, sizes from one quarter of an inch to one inch generally interchange by rotating interlock involving two cooperating jaws per head portion or head, and sizes from one and one quarter of an inch to two inches generally interchange by rotating interlock involving four cooperating jaws per head portion or head. See e.g., the aforementioned Goodall, Allen, Kelly, Kutina et al. & Treloar et al. patents. Of course, other designs are possible, e.g., three or five cooperating jaws per head portion or head, etc., as appropriate if desired.

Preferably, in general reference to the drawings, the head portion 100 includes two cooperating jaws 110, two ribs 120 and perforated outward extensions 130 for receiving an optional locking device, e.g., pin, which may be an automatic safety pin 131 having a thumb lever 132 and spring 133, when the coupling member 1000 is coupled to another known universal coupling or to another coupling member like itself. The head portion 100 also includes base 140 having orifice 141, and so forth. Through the head portion 100 runs a fluid passageway 400. The head portion 100 is substantially of a one-piece general construction. As an expedient, the head portion 100 can be provided by severing the attached stem of known universal couplings, e.g., by sawing off the attaching means 3 of the head 2 of the coupling for hose of the aforementioned Goodall patent, and so forth. However, the head portion is advantageously made more directly to form. The head portion can be made of a suitable cast, forged, molded, or stamped material such as one selected from among metals or engineering plastics, especially iron-containing metals or alloys, e.g., malleble or ductile iron, or the like.

Alternatively, in reference to FIG. 10 of the drawings, the head portion 100 includes four cooperating jaws 110, four ribs 120 and perforated outward extensions 130 for receiving an optional locking device, e.g., pin, when the coupling member is coupled to another known universal coupling or to another coupling member like itself. Again, the head portion 100 also includes base 140, and so forth.

Preferably, in general reference to the drawings, the stem portion 200 includes means for attaching 210 adapted to receive a hose, or threaded for receipt into a suitable corresponding threaded receptacle, e.g., as in mounting through the wall or outlet of a compressor, as is known in the art as in, e.g., the Goodall and Treloar et al. patents, and also includes a recess 220 adapted for receiving a means for restraining, e.g., a.clip, 221, at a position just outside the base of the head portion especially for ease of assembly when the stem portion 200 is initially assembled in the head portion, a shaft 230 having an outside diameter just slightly smaller than the diameter of the round orifice in the base of the head portion so as to be rotatable without being inordinately loose or sloppy therein, the shaft 230 includes cylindrical (FIGS. 1 and 3) and frusto-conical (FIG. 8) embodiments, and a shoulder 240 which can rest on the inside of an abutment base of the head (FIG. 3) when the stem portion 200 is assembled therein. Optionally, in the shoulder 240 can reside a recess 241 typically adapted to receive a bead or other projection on a gasket employable in the practice of this invention. See e.g., FIG. 8. Axially through the stem portion 200 runs a fluid passageway 400. The stem portion can be made of a suitable cast, forged, molded, cold-rolled, stamped, and/or machined material such as one selected from among metals or engineering plastics, especially iron-containing metals or alloys, e.g., machined cold-rolled steel pipe, or the like, as such pipe can provide the mentioned greater fluid throughputs. Machining is advantageously employed, especially in making the means for attaching 210, which can be thus made to have barbs 211 smaller and spaced closer together, e.g., 12-13 per inch, than are typically provided by casting so that the hose 500 can be attached easier and remain attached more strongly. See e.g., FIG. 9, and so forth.

Preferably, in general reference to the drawings, the gasket 300 includes siding 310 and facing 320, and as part of the external facing concentric projections 321. The concentric projections 321 may be provided by or considered to be the result of a grooving operation, which may be advantageously employed. Optionally, the gasket 300 can have a bead 311 or other projection on the inside of the siding 310, which is designed to be generally receivable in the recess feature of the shoulder of the stem portion of the coupling member of this invention. Thus, the gasket 300 can be considered to be generally L-shaped in half cross section. The gasket 300 is generally intended for sealable contact with the stem portion, especially about the shoulder thereof. The gasket can be made of a suitable substance such as an appropriately elastomeric or resilient and deformable rubber and/or plastic, see e.g., the aforementioned Kutina et al. patent, etc., especially one such that when the coupling member is coupled, the worker need exert a substantially lesser rotating force on the two heads, e.g., two head portions 100 or one head portion 100 with one known universal coupling head, and yet the coupled coupling combination does not leak substantially thus.

Coupling of the coupling members of this invention is generally effected by methods known in the art. See e.g., the aforementioned Goodall patent, etc. The coupling action places gaskets of the coupled coupling members in sealing contact with registry of fluid passageways.

Coupled combinations employing the coupling member(s) of this invention can be effectively used without employing safety (restraining) pins and yet remain coupled. Nonetheless, use of safety pins, particularly automatically engaging safety pins, is recommended.

CONCLUSION

The present invention is thus provided to include its provision by reference to preferred embodiments thereof. Various modifications can be effected by those skilled in the art within the spirit of this invention, the scope of which is particularly pointed out by the following distinctly claimed subject matter.

What is claimed is:

1. An article of manufacture comprising a coupling member of the universal kind, adapted and useful for conveying a compressed gas, having a head portion substantially of a one-piece general construction and having an orifice therethrough, a front coupling face end, a recessed portion, an internal abutment within said orifice and a rear end extending from said abutment, a stem portion having a passageway therethrough surrounded by an imperforate wall section and a front shoulder having a front and rear face, said stem portion insertable from the front coupling face end of said head portion and inset in said head portion, said rear face of said shoulder resting on said internal abutment of said head portion and being rotatable relative to said head portion and said rear end engaging said stem portion, and a one-piece cylindrical gasket having a passageway therethrough and a rear annular bead portion extending from said cylindrical portion and a front sealing face, said gasket inset in said head portion and in sealable contact with said front shoulder on said stem portion, said annular bead portion fitting within said recessed portion and said passageway in said gasket being coaxial with said passageway in said stem portion for conveying the compressed gas, said coupling member having means thereon for sealingly connecting to another similar coupling member of the universal kind wherein the front face of the gasket abuts a similar gasket in said another similar coupling member thereby providing a sealed passageway for the compressed gas, said connection allowing said stem portion to rotate relative to said head portion when sealingly connected to said another similar coupling member and also when a surge of the compressed gas is passed through the passageway so that uncoupling effects of twist or torque in a coupled combination with said another similar coupling member are relieved.

2. The article of claim 1, which has two cooperating jaws in said head portion, is interchangeable with known similar couplings of the universal kind in size from one quarter of an inch to an inch, and is adapted and useful for conveying compressed air.

3. The article of claim 1, wherein said stem portion includes a means for attaching, which is adapted to receive a hose, and which has barbs that are smaller and spaced closer together than those that are typically provided by casting, such that said hose can be attached easier and remain attached more strongly therewith.

4. The article of claim 3, wherein said barbs are in an interval spaced at about 12-13 per inch.

5. The article of claim 3, which is adapted and useful for conveying compressed air.

6. The article of claim 2, which is adapted and useful for conveying compressed air.

7. The article of claim 2, wherein said stem portion includes a means for attaching, which is adapted to receive a hose, and which has barbs that are smaller and spaced closer together than those that are typically provided by casting, such that said hose can be attached easier and remain attached more strongly therewith.

8. The article of claim 7, wherein said barbs are in an interval spaced at about 12-13 per inch.

9. The article of claim 1, which has four cooperating jaws in said head portion, is interchangeable with known similar couplings of the universal kind in size from one and one quarter of an inch to two inches, and is adapted and useful for conveying compressed air.

10. The article of claim 9, wherein said stem portion includes a means for attaching, which is adapted to receive a hose, and which has barbs that are smaller and spaced closer together than those that are typically provided by casting, such that said hose can be attached easier and remain attached more strongly therewith.

11. The article of claim 10, wherein said barbs are in an interval spaced at about 12-13 per inch.

12. The article of claim 1, which is adapted and useful for conveying compressed air.

* * * * *